United States Patent
Mauti, Jr.

(10) Patent No.: US 8,121,628 B2
(45) Date of Patent: Feb. 21, 2012

(54) VEHICLE TELEMATICS UNIT DATA UPLOAD DEFERRAL

(75) Inventor: Thomas K. Mauti, Jr., Sterling Heights, MI (US)

(73) Assignee: General Motors LLC, Detroit, MI (US)

( * ) Notice: Subject to any disclaimer, the term of this patent is extended or adjusted under 35 U.S.C. 154(b) by 1066 days.

(21) Appl. No.: 11/964,255

(22) Filed: Dec. 26, 2007

(65) Prior Publication Data

US 2009/0170537 A1 Jul. 2, 2009

(51) Int. Cl.
*H04Q 7/20* (2006.01)

(52) U.S. Cl. ......................... 455/466; 340/5.21; 455/428

(58) Field of Classification Search ................. 455/41.2, 455/432.1, 432.2, 432.3, 435.3, 428, 466, 455/575.9

See application file for complete search history.

(56) References Cited

U.S. PATENT DOCUMENTS

| | | | |
|---|---|---|---|
| 6,871,067 B2* | 3/2005 | Clark et al. | 455/428 |
| 2007/0087756 A1* | 4/2007 | Hoffberg | 455/450 |
| 2008/0204191 A1* | 8/2008 | Alrabady | 340/5.21 |

* cited by examiner

*Primary Examiner* — Dwayne Bost
*Assistant Examiner* — Myron Wyche
(74) *Attorney, Agent, or Firm* — Anthony L. Simon; Reising Ethington P.C.

(57) ABSTRACT

A method for deferring a telematics data upload from a vehicle equipped with wireless telephony and wireless networking communications devices. The method steps include detecting the availability of a connection to one or more wireless networks along with an associated time of day during which the connection is available, determining that one of the one or more wireless networks is periodically available at a particular time of day, receiving a request to upload data from the vehicle to a central facility via a wireless telephony connection, delaying the data upload until the particular time of day, and uploading the data to the central facility via a wireless network connection to the previously determined particular wireless network.

20 Claims, 4 Drawing Sheets

VEHICLE TELEMATICS UNIT DATA UPLOAD DEFERRAL

TECHNICAL FIELD

The present invention generally relates to a method for communicating data and, more particularly, to communications methods that are used to upload data from vehicles via wireless networks.

BACKGROUND

Modern vehicles acquire and use large quantities of data. Vehicles wirelessly transmit and receive significant amounts of this data via a telematics unit through wireless telephony. But wireless data transmission can be costly. Often data is transmitted via data packet sessions which can come at a significant expense over an extended period of time. Data packet sessions may use significant bandwidth and experience slower data transfer times; qualities that becomes more apparent when transferring data to and from a large fleet of vehicles.

Localized wireless networks are becoming more plentiful, increasing the number of locations where a user can send and receive data. Wireless data is now commonly transmitted between the user and a variety of localized wireless networks. These wireless networks allow a user to connect and wirelessly access the Internet or other communications network at many locations within a community. The user's wireless networking device can permit the sending and receiving of data, images, files or other general communications to and from the wireless network via various types of wireless protocols. While these localized wireless networks are inexpensive and plentiful, users may only be able access these networks when immobile and positioned within a relatively close proximity to the networks. Without close proximity to a localized wireless network, users are unable to send and receive communications.

SUMMARY OF THE INVENTION

According to one aspect of the invention, a method is provided for deferring a telematics data upload from a vehicle equipped with wireless telephony and wireless networking communications devices. The method steps include detecting the availability of a connection to one or more wireless networks along with an associated time of day during which the connection is available, determining that a particular one of the one or more wireless networks is periodically available at a particular time of day, receiving a request to upload data from the vehicle to a central facility via a wireless telephony connection, delaying the data upload until the particular time of day, and uploading the data to the central facility via a wireless network connection to the previously determined particular wireless network.

According to another aspect of the invention, there is provided a method for deferring a telematics data upload from a vehicle equipped with wireless telephony and wireless networking communications devices. The steps include obtaining the time, day, and location of a telematics unit each time the telematics unit wirelessly connects with a wireless network, recording the time, day, and location information in a database, analyzing the recordings to detect a connection periodicity, determining whether a data transmission from the telematics unit to a central facility occurs within a time, day, and location range that corresponds to the detected connection periodicity, and delaying the data transmission from the telematics unit to a call center, based on the determination, until the telematics unit connects to a wireless network associated with the connection periodicity.

According to another aspect of the invention, there is provided a method for deferring a telematics data upload from a vehicle equipped with wireless telephony and wireless networking communications devices. The steps include detecting if a telematics unit connects to a wireless network and, if the telematics unit connects to the wireless network, then recording time and day information corresponding to the connection. That information is stored in a database. The method involves recognizing particular wireless network connections that occur at substantially the same time and on the same day based on the information in the database, and implementing a filter, based on the recognizing of particular wireless connections, that inhibits telematics data transmission until the telematics unit connects to a particular wireless network connection when the telematics unit is within a predetermined geographical area and temporal range.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The communications method described below attempts to control a wireless data connection used by a telematics-equipped vehicle so that data can be sent to and received from the vehicle. Generally, this method involves a vehicle equipped with wireless telephony and wireless networking communications devices, where the telematics data upload from the vehicle can be deferred based on the vehicle's current location and time of day in conjunction with previously-determined information concerning the availability of a particular wireless network. Thus, for example, if the vehicle is normally garaged at the operator's home each day at 5:30 pm and there is a (home) wireless network connection available to the vehicle at the garaged location, then in the event that a data upload is desired at, for instance, 4:00 pm and the vehicle's location indicates that it is within 30 miles of the operator's home, the method will defer the data upload until 5:30 pm with the expectation that the vehicle will be garaged and the home wireless network will be available.

Communications System—

Figure 1:
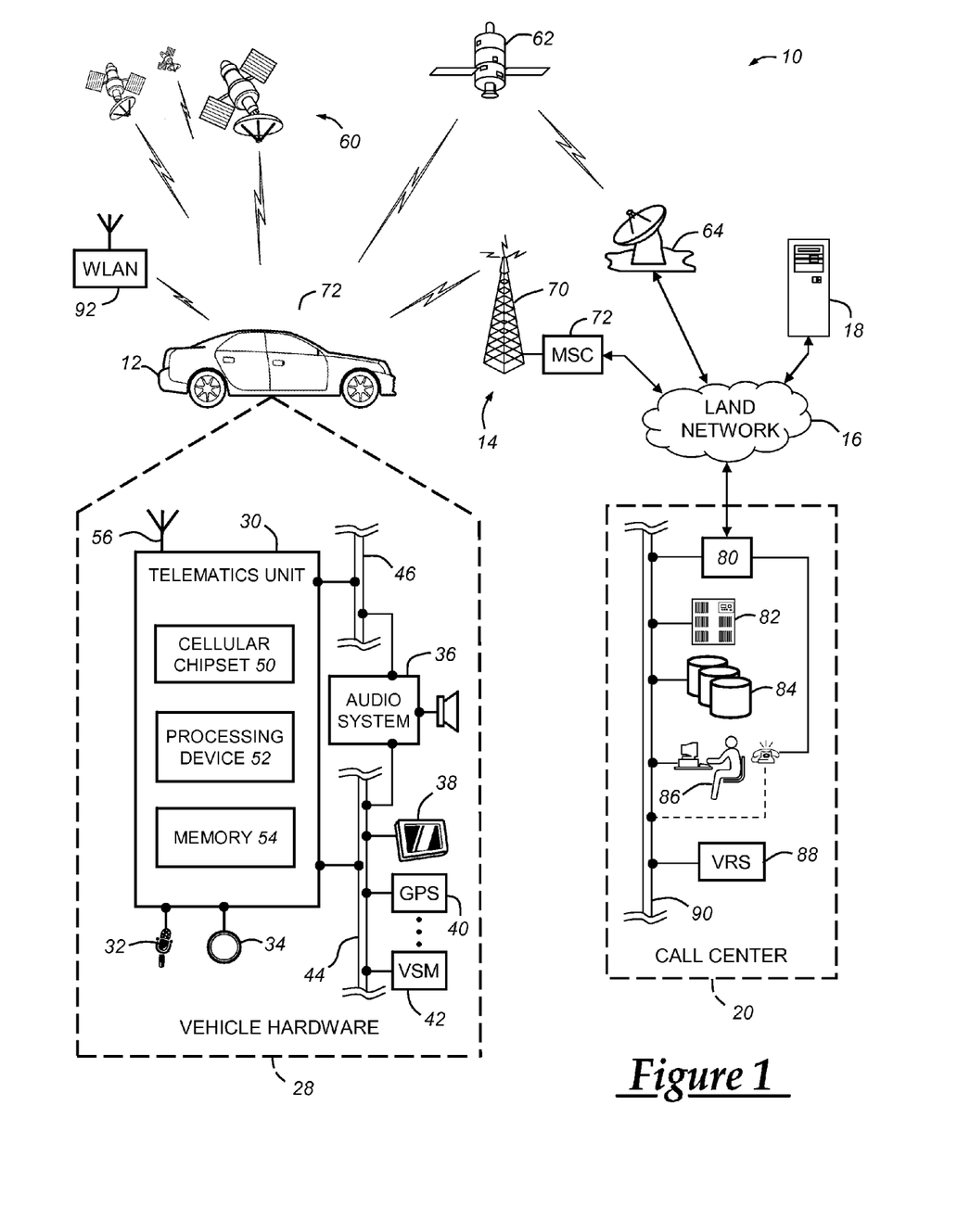
FIG. 1 is a block diagram depicting an exemplary embodiment of a communications system that is capable of utilizing the communications method disclosed herein.

With reference to FIG. 1, there is shown an exemplary operating environment that comprises a mobile vehicle communications system 10 and that can be used to implement the communications method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices 92 can also be carried out using telematics unit 30. For this purpose, telematics unit 30 can be configured to communicate wireless according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network 92 such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Wireless network 92 can generally be any telecommunications network that interconnects nodes without wires. Like the wireless carrier system 14, wireless networks 92 are implemented using some form of remote information transmission system employing electromagnetic waves, such as radio waves, for the carrier signal. Various types of wireless networks 92 can be used to communicate with vehicle hardware 28. The telematics unit 30 can communicate with a wireless network 92 via the wireless modem, sending and receiving data to and from the network 92. In one particular embodiment, the wireless network 92 is implemented as a wireless LAN (WLAN) using WiFi, Fixed Wireless Data, or WiMAX communication. Increasingly, businesses, residences and other organizations are erecting wireless networks 92 that can be private or publicly available to many users. Wireless networks can be solitary, situated in isolated places. But wireless networks 92 can also be located in close proximity to other wireless networks 92. When wireless networks 92 are located in close proximity to one another, they can function as stand alone networks 92 or they can be interconnected via a wireless mesh network capable of interconnecting a large number of wireless networks 92. In this case, each wireless network 92 can act as a repeater to transmit data from nearby wireless networks 92 to other wireless networks 92 that are too far away to reach, resulting in a wireless mesh network that can span large distances, especially over rough or difficult terrain.

Wireless networks 92 are capable of allowing users with wireless networking communications devices to connect with a particular wireless network 92 and wirelessly send and receive data via the aforementioned data transmission protocols. Wireless networking communications devices connecting to a wireless network 92 often can access the Internet for web browsing, email, or other data exchange. Some examples of wireless networking communications devices are PCs, PDAs, cell phones, or telematics units 30, but it will be appreciated by those skilled in the art that a wireless communications device includes any device capable of peer-to-peer or client-server exchange of information.

Communications Method—

Figure 2:
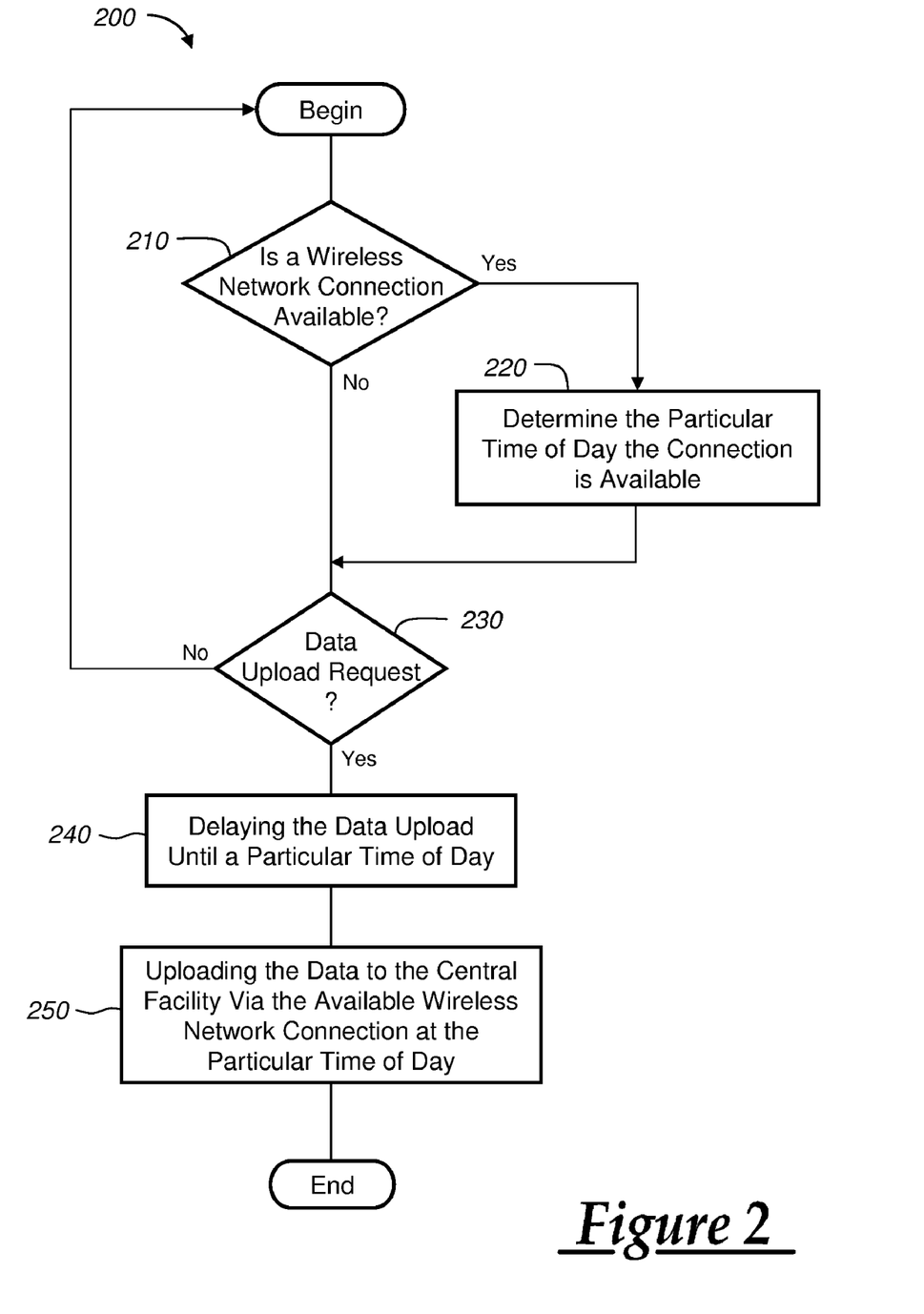
FIG. 2 is a flow chart depicting some of the steps of an embodiment of the communications method.

Referring to FIG. 2, the illustrated communications method 200 can be used to defer a telematics data upload from a vehicle 12 equipped with wireless telephony and wireless networking communications devices. The method is useful, for example, where data upload from the vehicle is typically done using either data communication over a voice channel of a wireless cellular network (e.g., network 14) or via a packet data connection over that same cellular network. The method can be used to instead upload the data via a wireless LAN connection between the vehicle and a nearby node, thereby avoiding the cost of using the cellular telephony network 14. The method can also be used for other purposes as will be appreciated by those skilled in the art.

At step 210, the availability of a connection to one or more wireless networks 92 can be detected. If so, the process determines the particular time of day that the connection is available, at step 220. This might include both time of day and day of week since the vehicle may be in certain locations Monday through Friday, but not on the weekend. This can also include determining the absolute date and not just day of the week.

For instance, the vehicle 12 can move through a variety of geographical areas and while traveling in each area may detect the presence or availability of one or more wireless networks 92. It can also detect availability of networks when parked or otherwise stopped at a location. Alternatively, the step 210 can be configured to only operate when the vehicle is not currently moving, so that it will only detect networks that are available when the vehicle is at least temporarily stopped at a location. In another example, where the telematics unit is configured to automatically connect to a certain network or any network, then rather than detecting the presence of an available network connection, the method instead detects whether the telematics unit 30 is or has connected to a wireless network 92. Thus, at step 210, determining if a network connection is available is carried out by determining if the telematics unit is connected to a network.

When determining the particular time of day at step 220, the telematics unit 30 or other vehicle hardware 28 can make a record of each time the vehicle 12 detects the presence or availability of a wireless network 92. More specifically, the record can include data parameters such as the time, day, location, and name of the network. Location information can be generated by using a GPS-Based receiver that generates longitude and latitude coordinates precisely positioning the network 92. After generating the record, the vehicle 12 can then store the record in the electronic memory devices 54 or some form of non-volatile memory.

Figure 3:
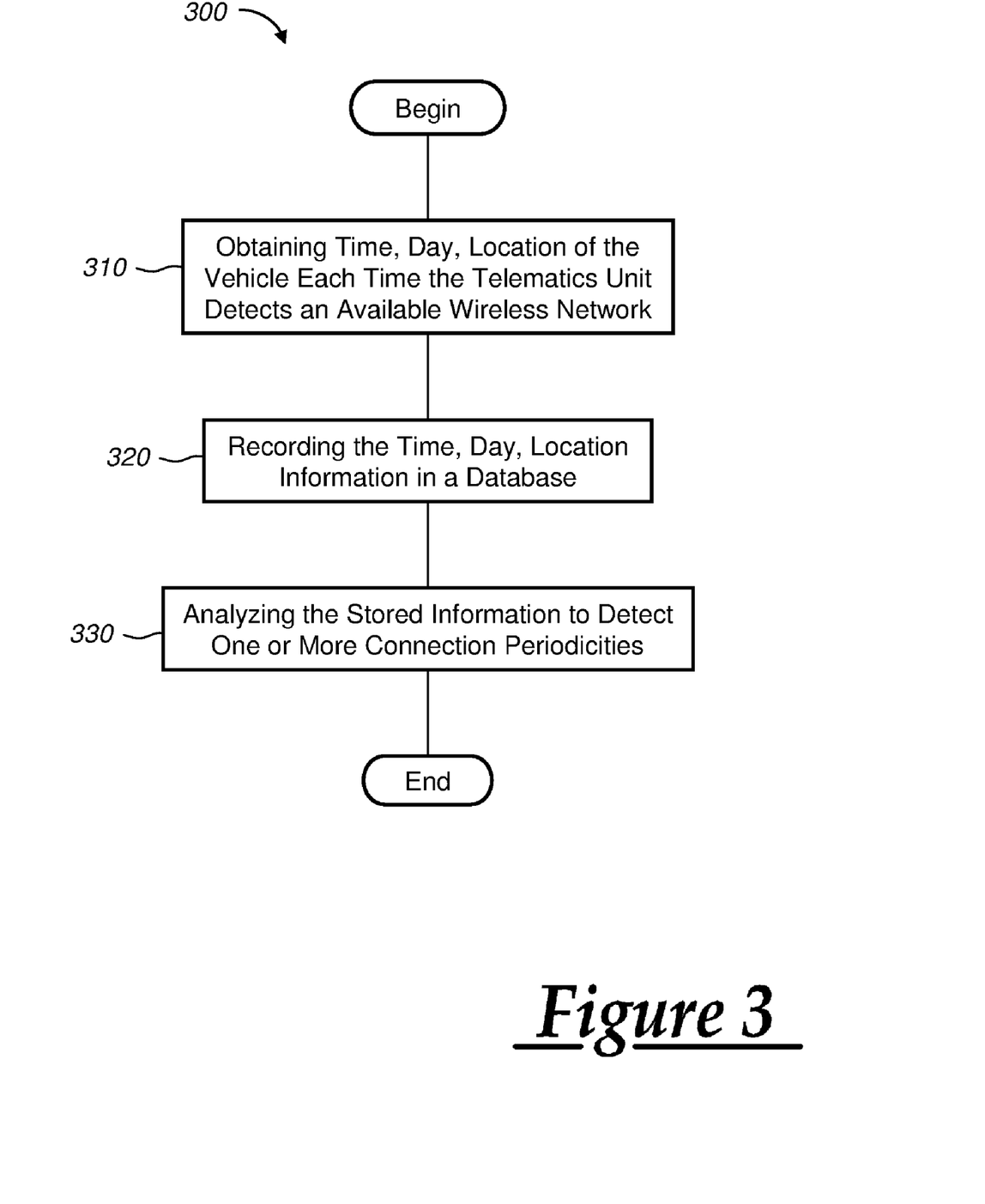
FIG. 3 is a flow chart showing the steps involved in an exemplary method of determining periodic availability of various particular wireless networks.

Referring briefly to FIG. 3, the stored time, day, and location information can be used to determine the time and location of frequently-available networks 92 for later use in data uploads. As shown at step 310, each time the vehicle detects the availability of a network, it obtains the relevant information which, at step 320 can then be stored in a database. Then, at step 330, the records stored by the vehicle 12 in step 320 can be analyzed to predict whether a wireless network 92 becomes periodically available to the vehicle 12 during a predictable window of time. The number of records needed to generate the predictable window of time with a desired specificity can be highly variable. As an example, if the vehicle 12 generates a large number of records for the same wireless network 92 over a short amount of time, it may denote frequent encounters with a particular network 92. If each or many of the large number of records indicated that the vehicle 12 encountered a particular wireless network 92 at a similar time and day, there may be a great likelihood that the vehicle 12 will encounter a particular wireless network 92 periodically during the predictable window of time. But if the vehicle 12 generates relatively few records, or the records contain somewhat varying times and days, the algorithm can require different limits or filters to decide whether or not a desired specificity for determining a particular wireless network 92 has been achieved. For instance, the telematics unit 30 can employ an algorithm to calculate whether the vehicle 12 or telematics unit 30 detects a particular wireless network 92 with enough regularity. While a vehicle 12 spending the majority of time in heavily populated urban areas may generate tens or hundreds of records, a vehicle 12 operating in rural areas may only generate one or two records a week. But receiving records once or twice a week can be sufficient to detect a schedule or trend. Also, the system can record the length of time that the connection is available each time it is detected so that, for example, connections that are frequently available, but only momentarily, will not be identified by the method as candidates for data upload. By using an algorithm with variables having predefined thresholds or limits, such as number of contacts, contact frequency, contact length, and correlation of time of day, someone such as a manufacturer, designer, or user can configurate the algorithm to detect a desired periodicity. This periodicity can be implemented as a predictable window of time in which a particular wireless network 92 will be available, in a wide range of environments. Or it can be a particular location regardless of the date or time of day. This connection periodicity can be used to generate availability information indicative of the conditions under which a particular network is expected to be available. As discussed above, such conditions can be time, day and/or location. In this regard, using the stored database information, it is possible to generate a probability that the telematics unit 30 will connect with a particular wireless network 92 during a predictable window of time or at a particular location. This probability information can be used in determining the connection periodicity or availability information.

Referring back to FIG. 2, regardless of whether or not a network is currently available, the process moves to step 230 where a check is made to determine if there is a data upload request. Such a request can be, for example, a request from the call center 20 to the telematics unit 30 to provide it with a general or specific set of data. Some examples of this data are mileage, oil life, emissions data or diagnostic trouble codes. The call center 20 can send the vehicle 12 requests for such data both periodically and sporadically, knowing the vehicle 12 may direct the telematics unit 30 to send the requested data to the call center 20 via a packet data session over the wireless telephony connection. Alternatively, the request to upload data to the call center 20 can be generated by the telematics unit 30 or the vehicle 12. In another example, if the request to upload data from the vehicle 12 to a call center 20 asks for data that is emergency data, the vehicle 12 can bypass the method 200 and send the emergency data via the wireless telephony connection. Some types of emergency data are queries from the call center 20 to the vehicle 12 as to the well being of vehicle occupants or whether or not the telematics unit 30 detects the vehicle 12 to have been involved in an accident. Other types of emergency data can received at the telematics unit 30 from collision sensors on the vehicle 12 indicating vehicle damage. If no such request exists, then the process can loop back to the beginning and repeat. However, if there is an upload request, then the method proceeds to step 240.

At step 240, the data upload can be delayed until the particular time of day or until the vehicle is at the particular location at which one or more wireless network 92 is expected to be available. This delay can be determined based on the connection periodicity generally or on the availability information in particular. For example, after a request to upload data is received from the call center 20 or telematics unit 30, a decision can be made. If the telematics unit 30 expects the vehicle 12 to be within a predetermined (geographic) range and temporal window of a wireless network 92 that the vehicle 12 periodically encounters, the vehicle 12 can delay sending data via the wireless telephony connection in favor of transmitting the data via WLAN when the telematics unit 30 expectedly connects with a particular wireless network 92. As stated previously, the range can be defined and detected with the use of a GPS-Based receiver such as GPS module 40. More specifically, if the vehicle 12 receives a request for data from the call center 20 at 1:00 PM and the availability information indicates that there is a high probability that the vehicle 12 can access a particular wireless network 92 between the 1:30-2:00 PM, the vehicle 12 or telematics unit 30 can decide to temporarily ignore the request from the call center 20 and wait to access the particular wireless network 92. Once the vehicle 12 is within range of a particular wireless network 92, the telematics unit 30 can access the particular wireless network 92 via the wireless modem and send the data. This is shown at step 250. Optionally, the telematics unit 30 can send a brief message to the call center 20 via the wireless telephony connection alerting the call center 20 that an immediate response is not forthcoming. Sometimes, the vehicle 12 or telematics unit 30 accesses the wireless network 92 within the temporal window determined in step 220. Other times, the vehicle 12 can remain outside the range of the wireless network 92 during the temporal window. In this latter case, the vehicle 12 or telematics unit 30 can determine whether to revert to the vehicle's default data transmission mode where the telematics unit 30 sends the requested data via the wireless telephony connection or to continue waiting for a predetermined amount of time in case the telematics unit 30 travels within the range and can connect with a desired wireless network 92. In the aforementioned example, if the vehicle 12 did not connect with the desired wireless network 92 during the 1:30-2:00 PM temporal window, the telematics unit 30 can be programmed to wait for an additional amount of time before sending the requested data to the call center 20 via packet data session using the wireless telephony connection. Moreover, if the vehicle 12 or telematics unit 30 is not able to connect to the wireless network 92 either during the temporal window determined in step 220 or during an additional predetermined amount of time following the temporal window, the requested data can be sent to the call center 20 via packet data session using the wireless telephony connection.

Figure 4:
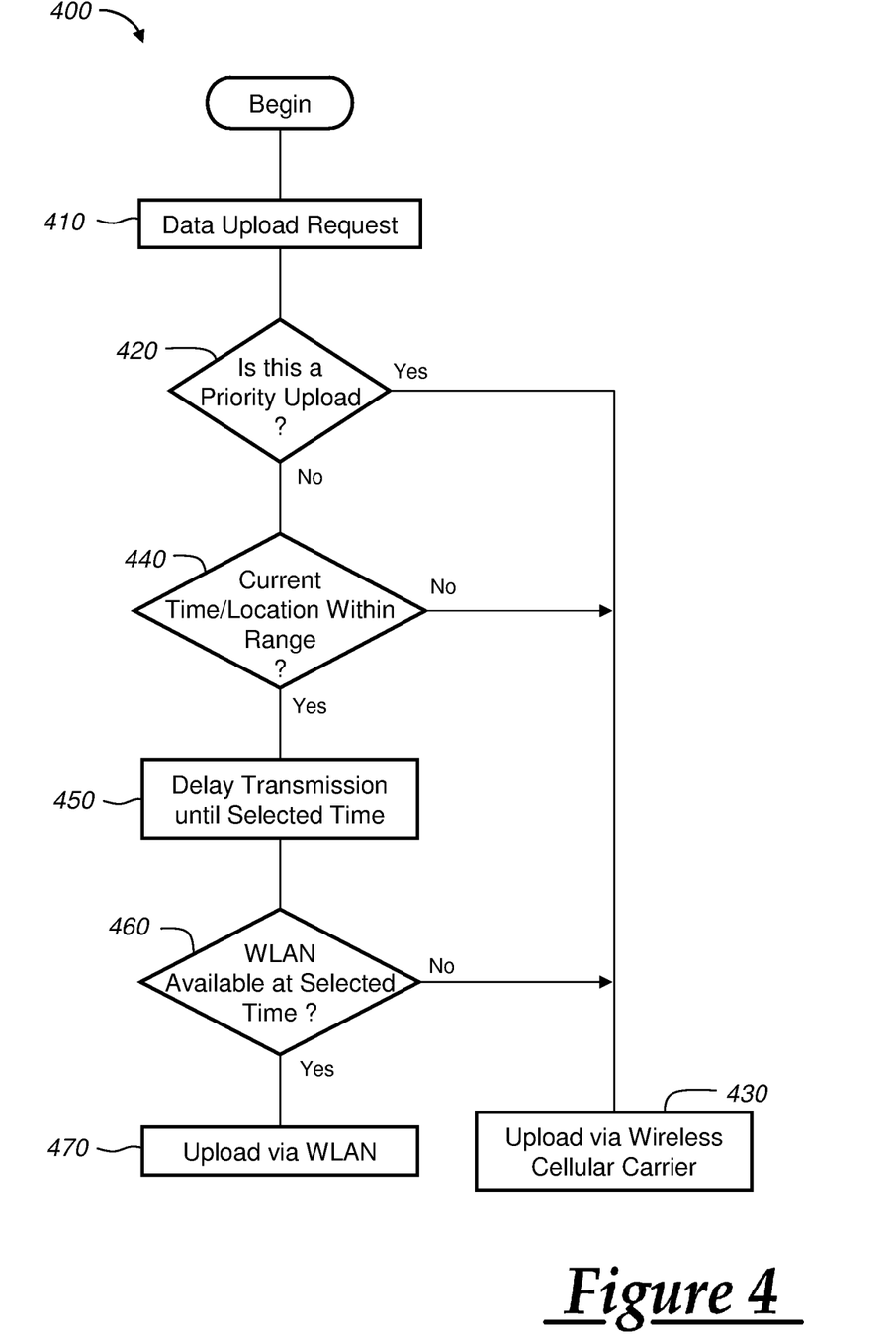
FIG. 4 is a flow chart depicting an embodiment of a method of deferring a data upload request until a wireless local area network is available.

Referring now to FIG. 4, there is shown a more specific embodiment of a method for implementing steps 240 and 250 of FIG. 2. At step 410 a data upload request is received or detected. Then, at step 420, the process determines if this is a priority data upload, which can be for things that are time sensitive, including, for example, information having some criticality to the vehicle operation, or being of an emergency nature, or to provide the current location to an authorize requestor. If it is a high-priority upload, then the process moves to step 430 where the data is immediately uploaded via the wireless cellular carrier 14. If it is not a priority upload, then the process moves to step 440 where a check is made to determine if the current time and/or vehicle location is within range of an expected available connection. This can be done using the availability information determined in FIG. 3 and can be based on time of day, location, or both. As an example, if the next expected available WLAN connection is not for several hours, then this step could decide that it is outside of a desired temporal window and thus too distant in the future to wait. Alternatively, if the vehicle determines that a connection at a particular geographic location is typically available within the next two hours and if the vehicle is within a certain distance (e.g., less than 50 miles), then the process could decide that the vehicle is within a predetermined range and temporal window and thus the upload should be delayed until the particular WLAN is available. If outside the desired time/location ranges, then the process moves to step 430 where the data is uploaded via the cellular network 14. If it is within the window, then the process moves to step 450 where the transmission is delayed until the expected time of availability of the particular network. Then, at step 460, when that time comes, a check is made to see if the particular WLAN is available. If not, this may indicate that the vehicle is not where it would typically be at this time of day and the process can move to step 430 either immediately or after waiting an additional amount of time for availability of the particular WLAN. If/once the WLAN is available, the telematics unit connects to it and the data is uploaded to the call center 20 or other desired location, as indicated at step 470. The process then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for deferring a telematics data upload from a vehicle equipped with wireless telephony and wireless networking communications devices, comprising the steps of:
   (a) detecting the availability of a connection to one or more wireless networks along with an associated time of day during which the connection is available;
   (b) determining that a particular one of the one or more wireless networks is periodically available at a particular time of day;
   (c) receiving a request to upload data from the vehicle to a central facility via a wireless telephony connection;
   (d) delaying the data upload until the particular time of day; and
   (e) uploading the data to the central facility via a wireless network connection to the particular wireless network determined in step (b).

2. The method of claim 1, wherein the step of delaying uploading data further comprises determining that the telematics unit has not connected to the particular wireless network before a second predetermined amount of time has expired and uploading the data via the telephony connection.

3. The method of claim 1, further comprising the step of storing latitude and longitude coordinates where the wireless network is periodically available.

4. The method of claim 1, further comprising the steps of determining the probability of the telematics unit connecting with the particular wireless network within the temporal window and, if the probability is less than or equal to a predefined threshold, deferring the connection and, if the probability is greater than the predefined threshold, uploading the data via the telephony connection.

5. The method of claim 1, wherein the determining step further comprises ensuring the upload data from the vehicle to the central facility is not emergency-related.

6. The method of claim 1, wherein the wireless networking communications device connects to the wireless network using a wireless protocol.

7. The method of claim 6, wherein the wireless protocol consists of either 802.11 or Bluetooth.

8. A method for deferring a telematics data upload from a vehicle equipped with wireless telephony and wireless networking communications devices, comprising the steps of:
   (a) obtaining the time, day, and location of a telematics unit each time the telematics unit wirelessly connects with a wireless network;
   (b) recording the time, day, and location information in a database;
   (c) analyzing the recordings to detect a connection periodicity;
   (d) determining whether a data transmission from the telematics unit to a central facility occurs within a time, day, and location range that corresponds to the detected connection periodicity; and
   (e) delaying the data transmission from the telematics unit to a call center, based on the determination, until the telematics unit connects to a wireless network associated with the connection periodicity.

9. The method of claim 8, wherein the step of delaying the data transmission further comprises determining that the telematics unit has not connected to the associated wireless network before a predetermined amount of time has passed and thereafter uploading the data to the central facility via a different communication path.

10. The method of claim 8, wherein the obtaining step further comprises a user providing a time, day, and location at which the user expects to connect to a wireless network.

11. The method of claim 8, wherein the telematics unit wirelessly connects to the wireless network using either 802.11 or Bluetooth.

12. The method of claim 8, wherein the step of detecting a connection periodicity further comprises recognizing that the telematics unit connects to a wireless network more often than a predetermined frequency during a predetermined period.

13. The method of claim 12, wherein the predetermined frequency and the predetermined period are modified by either the central facility or the user.

14. The method of claim 8, wherein the time, day and location range is modified at the direction of the user or the central facility.

15. A method for deferring a telematics data upload from a vehicle equipped with wireless telephony and wireless networking communications devices, comprising the steps of:
   (a) detecting if a telematics unit connects to a wireless network;
   (b) if the telematics unit connects to the wireless network, recording time and day information corresponding to the connection;

(c) inputting the information into a database;

(d) recognizing particular wireless network connections that occur at substantially the same time and on the same day based at least in part on the information in the database; and (e) implementing a filter, based on the recognizing of particular wireless connections, that inhibits telematics data transmission until the telematics unit connects to a particular wireless network connection when the telematics unit is within a predetermined geographical area and temporal range.

16. The method of claim 15, further comprising allowing the telematics unit to send the data immediately if the telematics unit fails to connect to the particular wireless network connection within a predetermined amount of time.

17. The method of claim 15, wherein the predetermined geographical area further comprises a range of latitude and longitude coordinates.

18. The method of claim 15, wherein, in step (e), inhibiting telematics data transmission further comprises delaying the transmission of data until connected to a particular wireless network and then sending the data via a packet data session.

19. The method of claim 15, wherein, in step (e), inhibiting of telematics data transmission is overridden if the data contains high-priority information.

20. The method of claim 15, further comprising the step of transmitting the data from the telematics unit without using the particular wireless connection if the telematics unit fails to enter the predetermined geographical area within the temporal range.

* * * * *